Sept. 8, 1931.   W. F. PIOCH ET AL   1,822,371
WELDING MACHINE
Filed June 20, 1929   3 Sheets-Sheet 1

INVENTOR
W. F. Pioch.
BY C. J. Martin
E. L. Davis
ATTORNEY

Sept. 8, 1931. W. F. PIOCH ET AL 1,822,371
WELDING MACHINE
Filed June 20, 1929 3 Sheets-Sheet 3

INVENTOR
W. F. Pioch.
BY C. J. Martin.
E. L. Davis
ATTORNEY

Patented Sept. 8, 1931

1,822,371

UNITED STATES PATENT OFFICE

WILLIAM F. PIOCH, OF DETROIT, AND CHARLES J. MARTIN, OF DEARBORN, MICHIGAN, ASSIGNORS TO FORD MOTOR COMPANY, OF DEARBORN, MICHIGAN, A CORPORATION OF DELAWARE

WELDING MACHINE

Application filed June 20, 1929. Serial No. 372,230.

The object of our invention is to provide improvements in a welding machine of simple, durable and inexpensive construction.

A further object of our invention is to provide a seam welding machine in which the electrode rollers used therewith are both driven.

The ordinary seam welding machine is provided with two electrode rollers between which two sheets of metal are fed to be welded. One of these rollers is ordinarily driven to force the sheets of metal therethrough, and the other is used to hold the sheets against the first roller. The secondary leads from a welding transformer are connected to these rollers so that the sheets of metal complete the electric circuit and are thereby welded at their point of contact with the rollers. As the rollers rotate a continuous line weld or seam weld is produced between the two sheets.

Only one of the electrode rollers used in the ordinary machine is driven because the wear on the rollers is not uniform, and consequently, the speed of any drive which might be provided for both rollers would have to be varied for one of the rollers as the rollers varied in size.

The electrode rollers used in seam welding machines, as well as in practically all other welding machines, are made of a copper alloy which is quite a soft metal. Generally speaking, the lower electrode roller wears considerably faster than the upper roller due to the fact that both rollers become very hot and the lower roller which carries the weight of the metal to be welded tends to flatten at the edge or point of contact with the sheets thereby reducing its diameter faster than the diameter of the upper roller is reduced.

The speed of rotation of these rollers is not especially important but it is important that the peripheral speed of both rollers be exactly alike, otherwise slipping must occur between one of the rollers and the stock which not only damages the roller but also tears away the semi-plastic metal of the weld. It might be possible to provide a variable drive mechanism to compensate for the difference in wear on the rollers, but this would undoubtedly be very expensive and would require the constant attention of the operator.

In the device described in this application, an ingenious method is employed for driving both of the rollers at an exactly equal peripheral speed irrespective of their diameters. The sheets of stock to be welded are thereby more positively fed through the machine and the danger of the sheets of metal sliding with respect to the rollers is thereby entirely eliminated. If the sheets slip only for an instant a hole is burned therethrough and the sheets must be scrapped.

Still a further object of our invention is to provide a seam welding machine in which both of the electrode rollers are frictionally driven by a pair of driving rollers, the latter being resiliently urged by an adjustable spring pressure against the adjacent electrode roller to thereby limit the torque of the electrode rollers and prevent breakage or damage to the machine if the electrode rollers are accidentally held from rotation.

In the ordinary seam welding machine the driven roller is positively connected with the driving motor. The gap between the two rollers is adjusted for the thickness of stock being welded so that the metal may be pressed firmly together as it travels between the two rollers. It sometimes happens that the operator of the machine attempts to weld stock for which the machine has not been adjusted, or pieces of scrap metal become lodged between the two sheets as the operator is feeding them between the rolls, and serious damage is thereby done to the rolls. Sometimes the whole machine is damaged from this cause.

In the applicants' machine the rollers are both frictionally driven so that when excessively thick stock is fed between the electrode rollers they simply stop rotating and the driving rollers continue to slip until the operator stops the machine and removes the stock.

Still a further object of our invention is to provide a seam welding machine in which means are provided for continuously dressing the electrode rollers to the correct shape for welding. In all types of welding machines having electrodes, the electrodes spread out or mushroom at the point of the weld and must be periodically dressed to the correct shape so that uniform welds may result. Electrode rollers are usually chamfered around their edge so as to produce a narrow seam weld.

In the applicants' device, the driving rollers are provided with V shaped grooves corresponding to the chamfer on the electrode rollers and radial serrations are machined in the sides of these grooves so that the metal of the electrode rollers is kneaded slightly by these serrations as the rollers revolve. When the electrode roller starts to flatten or mushroom its rather narrow edge, it is immediately brought back to shape by the driving roller so that the electrode need never be removed for dressing during its life.

This aforementioned feature is a decided improvement in seam welders and one which reduces materially the upkeep on the welding machine. The electrode rollers used on seam welding machines are quite expensive. Only the small outer portion of the roller may be used as the actual electrode and the roller must be discarded when this portion wears or is dressed away. The center portion of the roller is provided with a water chamber to cool the welding edge which in actual practice extends radially only about one inch from the cooling water chamber. If the electrode portion of the roller is made larger, the rollers become excessively hot due to insufficient cooling. Consequently, if very much of the roller is machined away in the dressing operation the life of the roller is very short. In the applicants' device none of the electrode roller is machined away while dressing so that the life of the roller is materially increased.

Further, considerable time is required to change the rollers, as there are two water connections to be broken when the roller is dressed on a lathe or similar machine. This time is saved when the applicants' machine is used.

With these and other objects in view our invention consists in the arrangement, construction, and combination of the various parts of our improved device, as described in the specification, claimed in our claims, and illustrated in the accompanying drawings, in which:

Figure 1:
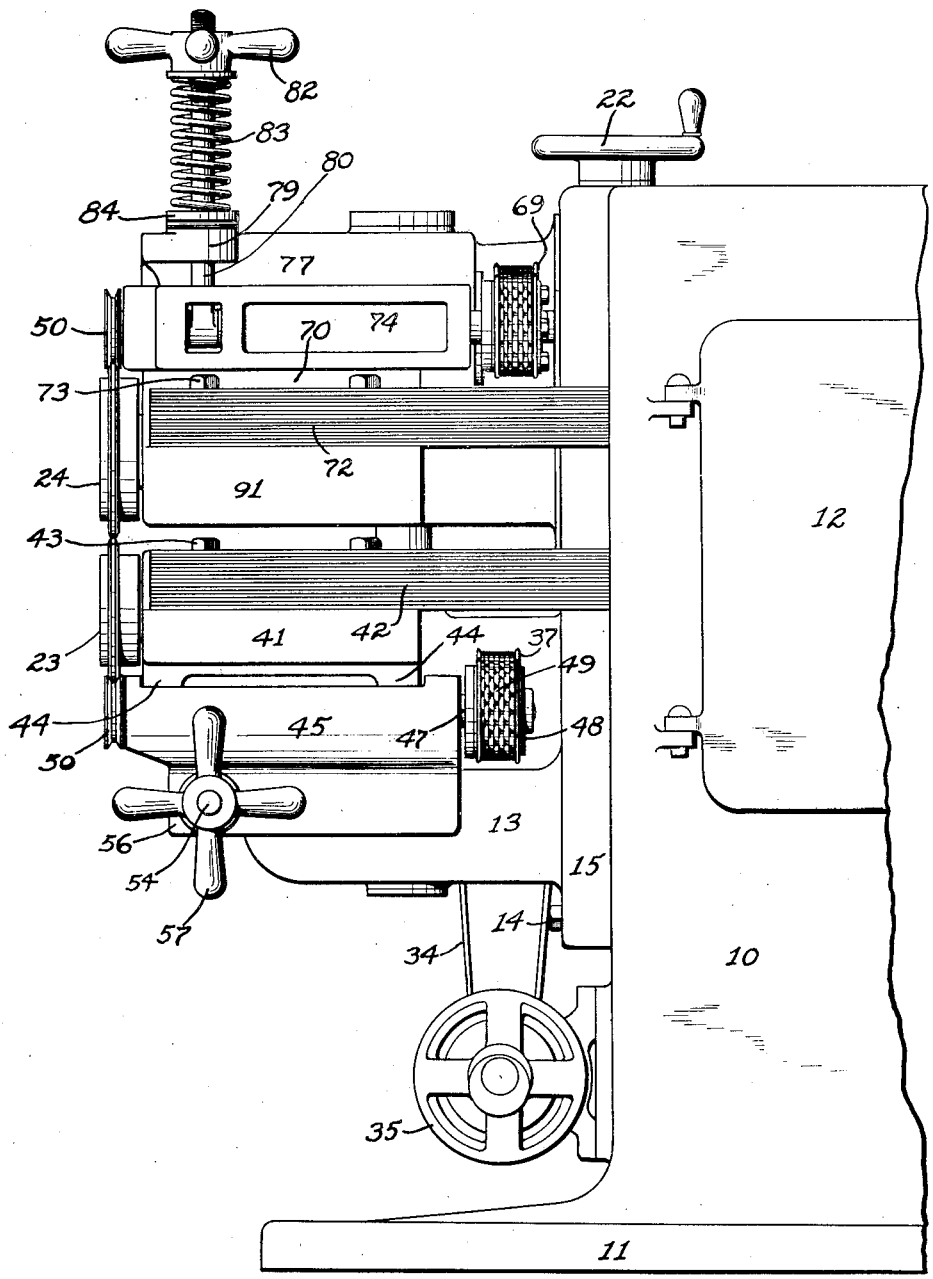
Figure 1 shows a side elevation of a welding machine having our improved roller drive mounted thereon.

Referring to the accompanying drawings, we have used the reference numeral 10 to indicate generally the body of a welding machine having a base plate 11 formed integral therewith. The body 10 is of a box-like shape and houses a welding transformer used with the machine. A door 12 is provided in one side of the body 10 so that the transformer may be readily accessible for replacement or repair.

A bracket 13 is secured to the center portion of the front face of the body 10 by means of the bolts 14 which co-act with a flange 15 formed on the bracket 13. A dovetailed way 16 is provided in the same face of the body 10 and extends vertically above the bracket 13. A plate 17 is provided for the way 16 in the conventional manner and is secured to the body 10 by means of the bolts 18. A gib 19 is secured adjacent to the plate 17 and a dovetail slide 20 is reciprocally mounted in the way 16 in the conventional manner. An adjusting screw 21 is rotatably mounted in the upper portion of the body 10 and co-acts with a nut secured to the slide 20 for raising and lowering this slide. A handwheel 22 is secured to the upper end of the screw 21 for manually adjusting the vertical position of the slide 20.

An electrode roller 23 is rotatably mounted in the bracket 13 in a fixed position relative to the body 10, and a second electrode roller 24 is rotatably mounted in the slide 20 adjacent to the roller 23. The gap between these two rollers may therefore be accurately adjusted for various thicknesses of stock by means of the hand wheel 22 and also the wear on the electrode rollers may thus be compensated for by lowering the slide 20. Any suitable means may be provided for rotatably mounting the rollers 23 and 24 and conducting welding current thereto.

Figure 2:
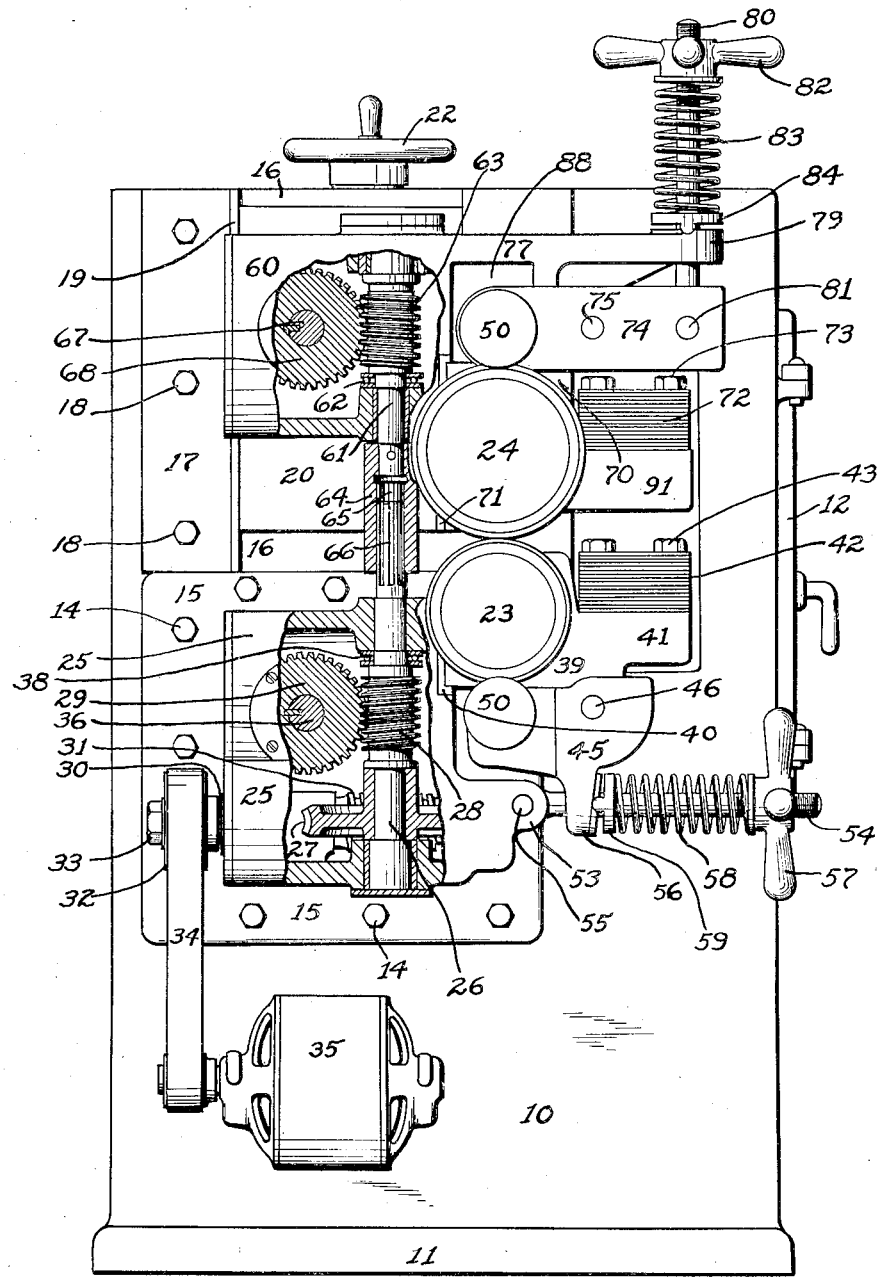
Figure 2 shows a front elevation of the machine shown in Figure 1, parts being broken away to better illustrate the manner in which both electrode rollers are driven.
Figure 3:
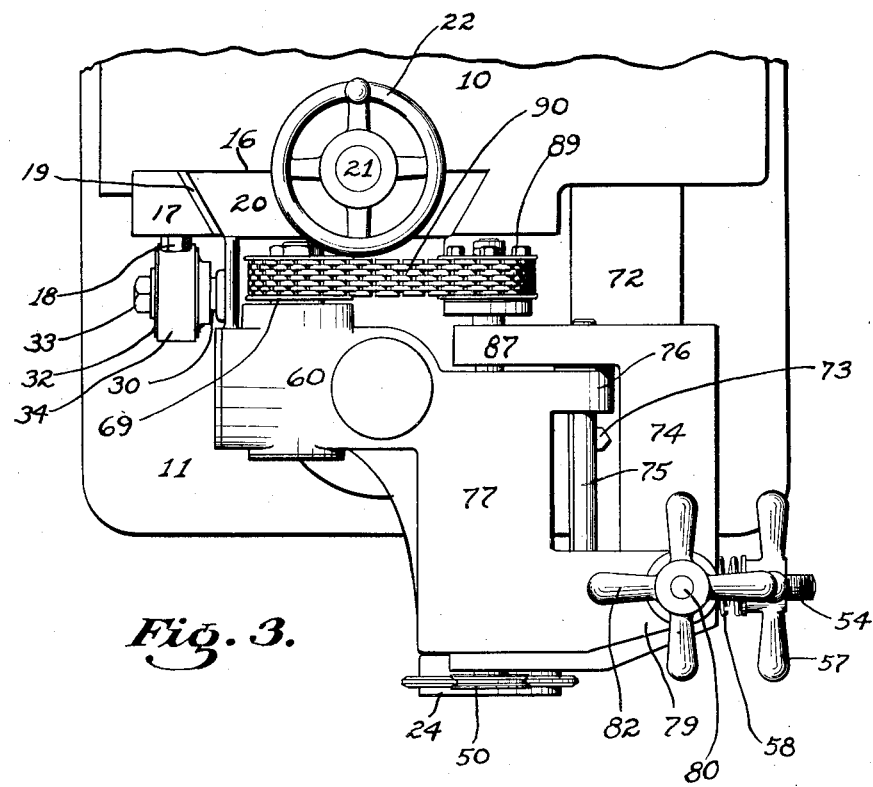
Figure 3 shows a top view of the machine, shown in Figure 1.
Figure 4:
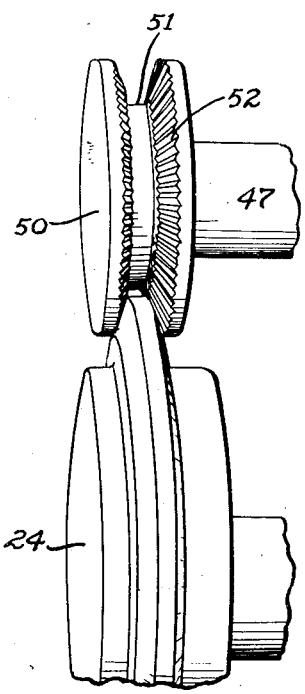
Figure 4 shows a perspective view of a driving and electrode roller illustrating the manner in which the driving roller serrations co-act with the chamfered edge of the electrode roller.

Referring to Figure 2, the bracket 13 is cored out to form a gear housing 25 and a worm shaft 26 is mounted for rotation in this housing with its axis vertical. A worm wheel 27 is secured to the lower end of the shaft 26 within the housing 25. A driving shaft 30 is transversely mounted in suitable bearings formed in the housing 25 and a worm 31 is secured thereto in position to mesh with the worm wheel 27. A pulley 32 is fastened to the outer end of the shaft 30 by means of a nut 33, and a belt 34 connects this pulley with an electric motor 35 which is mounted on the forward face of the body 10 below the bracket 13.

A worm 28 is formed integrally with the shaft 26 just above the worm wheel 27 and within the gear box 25. A horizontal shaft 36 is rotatably mounted in the housing 25 and a worm wheel 29 is secured to this shaft in position to mesh with the worm 28. A chain sprocket 37 is secured to the rear end of the shaft 36 outside of the housing 25 and adjacent to the flange 15.

From the foregoing it may be seen that the driving shaft 30 is rotated by the electric motor 35 through the belt 34 and the pulley 32, and the worm shaft 26 is rotated through the worm wheel 27 and worm 31. The drive is then taken through the worm 28, worm wheel 29, and shaft 36, to thereby rotate the sprocket 37. The reduction or the gear ratio of these various worms and worm wheels are so proportioned that an ordinary 1700 R. P. M. motor will drive the sprocket 37 about 30 revolutions per minute.

A suitable thrust bearing 38 is provided between the worm 28 and the housing 25 to absorb the driving thrust of the worm 28. The housing 25 is so arranged that both sets of worms and worm wheels referred to run in a bath of oil.

A horizontal member 39 is secured to the upper part of the bracket 13 and is insulated therefrom by means of a strip of insulation 40. The member 39 is provided with a lug 41 to which a flexible lead 42 is secured by means of the cap screws 43. Current from the lead 42 will thereby be conducted to the roller 23 through the member 39 but will be prevented from traveling to the body of the machine by means of the insulation 40.

A pair of ears 44 extend downwardly from the member 39 and a bracket 45 is pivotally mounted on these ears by means of a pin 46. A shaft 47 is rotatably mounted in the bracket 45 and extends parallel to the pin 46 and in substantially the same horizontal plane. The rear end of the shaft 47 is provided with a sprocket 48, aligned with the sprocket 37 and a chain 49 operatively connect these sprockets so that the shaft 47 may be positively driven by the shaft 36.

The shaft 47 is insulated from the bracket 45 by means of nonconducting bearing bushings, not shown; and the sprocket 48 is also insulated from the shaft 47 to which it is secured so that the welding current will not be short circuited through the machine.

The forward end of the shaft 47 is provided with a driving roller 50 which, in the form of the device here shown, is made integral with the shaft. This roller 50 is provided with an annular V shaped groove 51, the walls of which have radial serrations 52 machined therein. The groove 51 is aligned with the electrode roller 23 so that the serrations 52 contact with the chamfered edge of the roller to thereby increase the frictional driving connection between these two rollers. As the roller 23 is reduced in diameter due to wear, the bracket 45 may pivot around the pin 46 thereby bringing the roller 50 into contact with the electrode roller 23 at all times.

The bracket 13 is provided with a clevis 53 formed integrally therewith and a rod 54 is pivotally connected thereto by means of a pin 55. An ear 56 extends downwardly from the bracket 45 and has an opening formed therein through which the rod 54 extends. The outer end of the rod 54 is threaded and is provided with a hand nut 57 which acts against a compression spring 58, interposed around the rod 54 between this nut and an equalizing washer 59 which is provided adjacent to the ear 56.

When the hand nut 57 is screwed inwardly on the rod 54, the compression is increased on the spring 58 thereby forcing the bracket 45 around the pin 46 and urging the roller 50 with increasing pressure against the electrode roller 23. An adjustable friction drive is thereby obtained between the roller 50 and the electrode roller 23 which may be varied to suit all classes of stock capable of being welded in the machine. It will be noted that the shafts 36 and 47 and the pin 46 are substantially in line so that the arcuate movement of the shaft 47 may be compensated for by the normal slack in the chain 49.

The slide 20 is formed integrally with a second gear box 60 which extends forwardly therefrom. A worm shaft 61 is rotatably mounted in a vertical position in this gear box and a thrust bearing 62 is interposed around the shaft 61 between the gear box and a worm 63 machined on this shaft. The lower end of the shaft 61 is provided with a sleeve 64 secured thereto and having internal spline 65 machined therein to co-act with corresponding splines 66 machined on the upper end of the shaft 26. This arrangement is generally referred to as a telescopic connection and is provided so that the slide 20 may be raised or lowered and a driving connection will still be maintained at all times between the shaft 26 and the shaft 61.

A horizontal shaft 67 is rotatably mounted in the gear box 60 and a worm wheel 68 is secured thereto in position to mesh with the worm 63. A sprocket 69 is secured to the rear end of the shaft 67 outside of the gear box 60 adjacent to the slide 20. It will be noted that the worms 28 and 63 are of opposite lead so that the resulting motions of the sprockets 69 and 37 will be in the opposite directions.

A bearing member 70 is secured to the gear box 60 directly above the member 39 and an arbor formed integrally with the upper electrode roller 24 is rotatably mounted in this member 70. Suitable insulation 71 is provided for insulating this member from the gear box 60. A flexible transformer lead 72 is secured to a lug 91 projecting from the member 70 by means of bolts 73. Means are also provided for conducting current from the member 70 to the roller 24.

A beam 74 is pivotally secured to a bracket 77 formed integrally with the gear box 60 by means of a pivot pin 75 and ear 76 formed on the bracket 77.

An extension 79 projects outwardly from the bracket 77 and a rod 80 is mounted in a suitable opening in this extension. The lower end of the rod 80 is pivotally secured in the beam 74 by means of a clevis pin 81. The upper end of the rod 80 is threaded to take a hand nut 82 for adjusting the compression on a spring 83 which is mounted around the rod 80 between this nut and an equalizing washer 84 which bears against the upper face of the extension 79.

A second driving roller 85 is formed integrally with a shaft 86 which is rotatably mounted parallel to the pin 75 in suitable ears 87 on the beam 74. A horizontal opening 88 is provided in the bracket 77 so that the shaft 86 may oscillate around the pivot pin. The driving rollers 85 and 50 are identical in that both are provided with serrations 52 machined in the walls of the V shaped groove 51 formed therein.

A sprocket 89 is secured to the rear end of the shaft 86 in alignment with the sprocket 69 and a chain 90 connects these sprockets together. The shaft 86 is insulated from the ears 87 and sprocket 89 so that the current from the electrode roller 24 will not be short circuited through the machine.

The upper electrode roller 24 is thus frictionally driven by the driving roller 85, through the sprocket 69, chain 90, and sprocket 89. The sprocket 69 is driven by the worm gearing in the gear box 60 through the telescopic connection 65 from the worm shaft 26. The friction between the driving roller 85 and the electrode roller 24 may be adjusted by rotating the hand nut 82, to thereby adjust the pressure exerted by the spring 83.

To operate the device, the operator adjusts the gap between the electrode rollers 23 and 24 by raising or lowering the slide 20 to suit the thickness of the stock which is to be welded. The hand nuts 57 and 82 are then adjusted to secure a driving connection between the driving rollers 50 and 85 against the electrode rollers 23 and 24, respectively. The primary current is then switched on the transformer which impresses a low voltage high amperage welding current on the rollers 23 and 24 through the flexible leads 72 and 42. The electric motor 35 is then started which rotates these two electrode rollers through the aforementioned gearing and driving rollers. The stock to be welded is then simply fed between the two electrode rollers, and both of the rollers being driven, it is only necessary to guide the stock to secure a seam weld therebetween.

Many advantages arise through the use of our improved device and it may be well to point out some of these advantages. With this machine both of the electrode rollers are driven with a constant peripheral speed irrespective of their diameters to thereby more positively feed the stock through the machine. If the stock slips only for an instant, the weld is burned and the material being welded is usually scrapped because of this defect. Further, the uniform peripheral speed of the rollers provides a weld of superior structure because the liquid metal of the weld is not stretched by the drive being taken on only one side of the weld.

Another advantage results in that the both rollers are frictionally driven so that if metal, thicker than that for which the machine is adjusted, is placed between the electrode rollers the rollers simply stop until the operator removes the stock thereby preventing damage to the machine or the rollers. Still a further advantage results in that the driving rollers are provided with radial serrations acting against the chamfered edges of the electrode rollers thereby preventing the rollers from flattening or mushrooming. This latter feature materially increases the life of the rollers and saves the time required to change the rollers or to repair them.

Some changes may be made in the construction or combination of our improved device and it is our intention to cover by our claims such changes as may reasonably be included within the scope thereof.

We claim as our invention:

1. In a welding machine, an electrode roller rotatably mounted therein, means for guiding stock to be welded against said electrode roller, a driving roller rotatably mounted in contact with said electrode roller, and means for driving said driving roller to thereby frictionally drive the electrode roller.

2. In a welding machine, a pair of electrode rollers rotatably mounted therein, a pair of driving rollers arranged to frictionally engage said electrode rollers, and means for driving said driving rollers to thereby frictionally drive the electrode rollers.

3. In a welding machine, an electrode roller rotatably mounted therein, a driving roller resiliently urged against the electrode roller, and means for driving said driving roller to thereby frictionally drive the electrode roller.

4. In a welding machine, a pair of electrode rollers rotatably mounted therein, a pair of driving rollers, means for resiliently urging said driving rollers into contact with said electrode rollers, and means for driving said driving rollers to thereby frictionally drive the electrode rollers.

5. In a welding machine, a pair of electrode rollers rotatably mounted therein, a pair of driving rollers having annular V shaped grooves formed therein said grooves being arranged to contact with the periphery of said electrode rollers, and means for driving said driving rollers, the parts being so arranged that the electrode rollers will be frictionally rotated through contact with the walls of said grooves.

6. In a welding machine, a pair of electrode rollers having chamfered edges, a pair of driving rollers having annular V shaped grooves formed therein, radial serrations formed in the walls of said V shaped grooves, means for resiliently urging said grooves into contact with the chamfered edges of the eletrode rollers, and means for driving said electrode rollers, the serrations co-acting with the chamfered edges to prevent slippage between the driving rollers and the electrode rollers.

7. In a welding machine, a bracket secured thereto having an electrode roller rotatably mounted therein, a second bracket arranged for vertical reciprocation relative to said machine and having a second electrode roller rotatably mounted therein adjacent to said first mentioned roller, a driving roller rotatably mounted on said first mentioned bracket and resiliently urged against the first mentioned electrode roller, a second driving roller rotatably mounted on said second mentioned bracket and resiliently urged against the second mentioned electrode roller, and means for rotating said driving rollers, the parts being so arranged that vertical reciprocation of said second mentioned bracket will vary the space between the electrode rollers.

8. In a welding machine, a bracket secured thereto having an electrode roller rotatably mounted therein, a second bracket pivotally mounted on a pivot pin in the first mentioned bracket, a driving roller rotatably mounted in the second mentioned bracket and arranged to contact with said electrode roller, a sprocket connected to the driving roller, a driving shaft extending from the first mentioned bracket having a second sprocket secured thereto, and a chain connecting the sprockets, the parts being so arranged that the pair of sprockets and the pivot pin are substantially in alignment to lessen the slack required in the chain when the bracket is pivoted around the pivot pin.

9. In a welding machine, a bracket fixed thereto having an electrode roller rotatably mounted therein, a second bracket reciprocally mounted in said machine and having a second electrode roller rotatably mounted therein, a shaft extending from each of said brackets, a telescopic driving member connecting said shafts, a pair of driving rollers rotatably mounted in said brackets and arranged to contact with the electrode rollers, means for rotating each of said driving rollers from said shafts, and means for driving said shafts, the parts being so arranged that a driving connection will be maintained between said shafts by means of said telescopic connection irrespective of the reciprocation of said second mentioned bracket.

10. In a welding machine, a bracket fixed thereto having an electrode roller rotatably mounted therein, a second bracket reciprocally mounted in said machine and having a second electrode roller rotatably mounted therein, a shaft extending from each of said brackets, a telescopic driving member connecting said shafts, a pair of driving rollers rotatably and pivotally mounted in said brackets and resiliently urged into contact with the electrode rollers, means for rotating each of said driving rollers from said shafts, and means for driving said shafts, the parts being so arranged that a driving connection will be maintained between said shafts by means of said telescopic connection irrespective of the reciprocation of said second mentioned bracket.

11. In a welding machine having an electrode roller rotatably mounted therein, a driving roller having an annular groove therein rotatably mounted in said machine, means for driving said driving roller, and means for holding said groove into contact with the periphery of the electrode roller to thereby drive the electrode roller and to prevent slippage between the rollers.

12. In a welding machine, an electrode roller having a chamfered periphery rotatably mounted on said machine, a second roller rotatably mounted on said machine having an annular groove therein in which the chamfered periphery extends, and serrations formed in the walls of said grooves which knead the periphery of the electrode roller into a section complementary to said groove section.

13. In a welding machine, an electrode roller having a chamfered periphery mounted on said machine, a driving roller rotatably mounted on said machine having an annular groove therein in which the chamfered periphery extends, means for driving said driving roller, and serrations formed in the walls of said grooves which knead the periphery of the electrode roller into a section complementary to said groove section when the driving roller is driven.

14. In a welding machine having an electrode roller mounted to rotate on a relatively fixed axis therein, a driving shaft rotatably mounted in said machine, a driving roller secured to said shaft in position to contact with the periphery of the electrode roller, and means for driving the driving shaft to thereby frictionally rotate the electrode roller.

15. In a welding machine having a driven shaft rotatably mounted therein, an electrode roller fixedly secured to said shaft, a driving shaft rotatably mounted in said machine, a driving roller secured to said driving shaft, means for urging said driving roller into contact with the periphery of said electrode roller, and means for driving said driving shaft to thereby frictionally rotate the electrode roller.

16. In a welding machine having a pair of electrode rollers rotatably mounted therein on relatively fixed axes, a pair of driving rollers arranged to frictionally engage the periphery of said electrode rollers, and means for driving both driving rollers at the same peripheral speed to thereby frictionally drive both electrode rollers at the same peripheral speed irrespective of the diameters of said electrode rollers.

17. In a machine having a feeding roller rotatably mounted therein, said roller being subject to wear so that its circumference is materially reduced thereby, a driving roller rotatably mounted in frictional contact with the periphery of said feeding roller, and means for uniformly driving said driving roller to thereby drive said feeding roller at a constant peripheral speed.

18. In a machine having a feeding roller of relatively soft material rotatably mounted therein, said roller being subject to considerable peripheral wear during its useful life, a driving roller of relatively hard material rotatably mounted in frictional contact with the periphery of said feeding roller, and means for uniformly driving said driving roller to thereby drive said feeding roller at a constant peripheral speed.

19. In a machine having a feeding roller rotatably mounted therein the periphery of which is subject to a material reduction in length during the course of its useful life, a driving roller rotatably mounted in said machine so as to drive said feeding roller adjacent to its periphery, and means for uniformly rotating said driving roller to thereby rotate said feeding roller at a constant peripheral speed.

20. In a machine having a feeding roller rotatably mounted therein the periphery of which is subject to material reduction in length during the course of its life, a driving roller rotatably mounted in frictional contact with the periphery of said feeding roller, and means for rotating said driving roller to thereby secure a constant ratio between the rotation of said driving roller and the peripheral speed of said feeding roller.

21. In a machine having a feeding roller rotatably mounted therein said roller being subject to wear so that its circumference is materially reduced thereby, a driving roller rotatably mounted in said machine so as to drive said feeding roller adjacent to its periphery, and means for rotating said driving roller to thereby secure a constant ratio between the rotation of said driving roller and the peripheral speed of said feeding roller.

22. In a machine having a feeding roller of relatively soft material rotatably mounted therein said roller being subject to considerable peripheral wear during its useful life, a driving roller of relatively hard material rotatably mounted in said machine so as to drive the feeding roller adjacent to its periphery, and means for rotating said driving roller to thereby secure a constant ratio between the rotation of said driving roller and the peripheral speed of said feeding roller.

23. In a machine having a feeding roller of relatively soft material rotatably mounted therein said roller being subject to a material reduction in diameter during its useful life, a driving roller of relatively hard material rotatably mounted in said machine so as to frictionally drive the periphery of said feeding roller, and means for rotating said driving roller to thereby secure a constant ratio between the rotation of said driving roller and the peripheral speed of said feeding roller.

24. In a machine having a feeding roller rotatably mounted therein said roller being subject to a material reduction in diameter during its useful life, a driving roller frictionally engaging the periphery of said feeding roller, and means for rotating said driving roller to thereby secure a constant ratio between the rotation of said driving roller and the peripheral speed of said feeding roller.

WILLIAM F. PIOCH.
CHARLES J. MARTIN.